July 11, 1961 F. C. HOLMES 2,991,612
FRONT MOUNTED MOWER FOR RIDING TRACTOR
Filed June 1, 1959 5 Sheets-Sheet 1

INVENTOR
Frank C. Holmes
BY
Wooster, Davis & Cifelli
ATTORNEYS

INVENTOR
Frank C. Holmes
BY
Wooster, Davis & Cifelli
ATTORNEYS

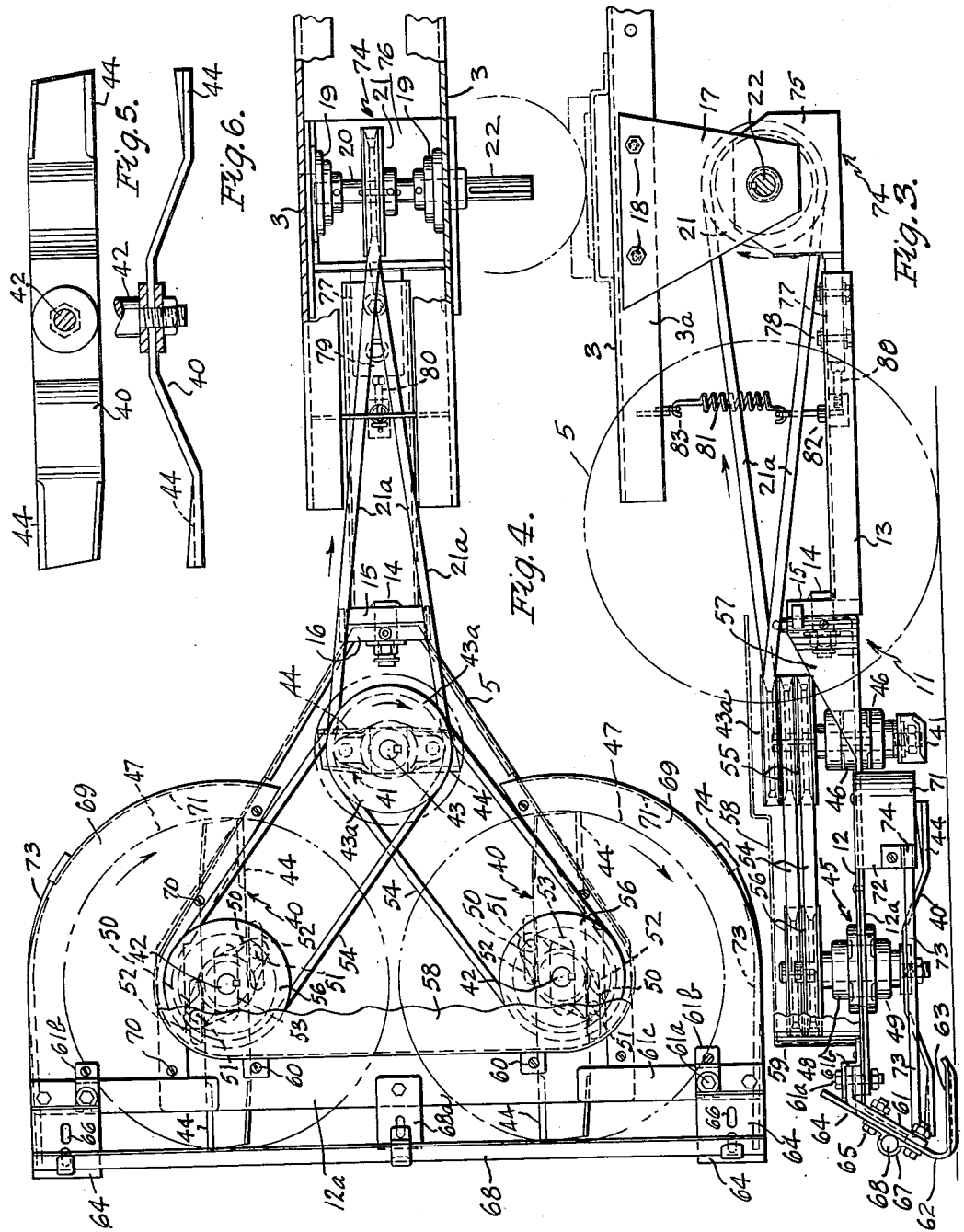

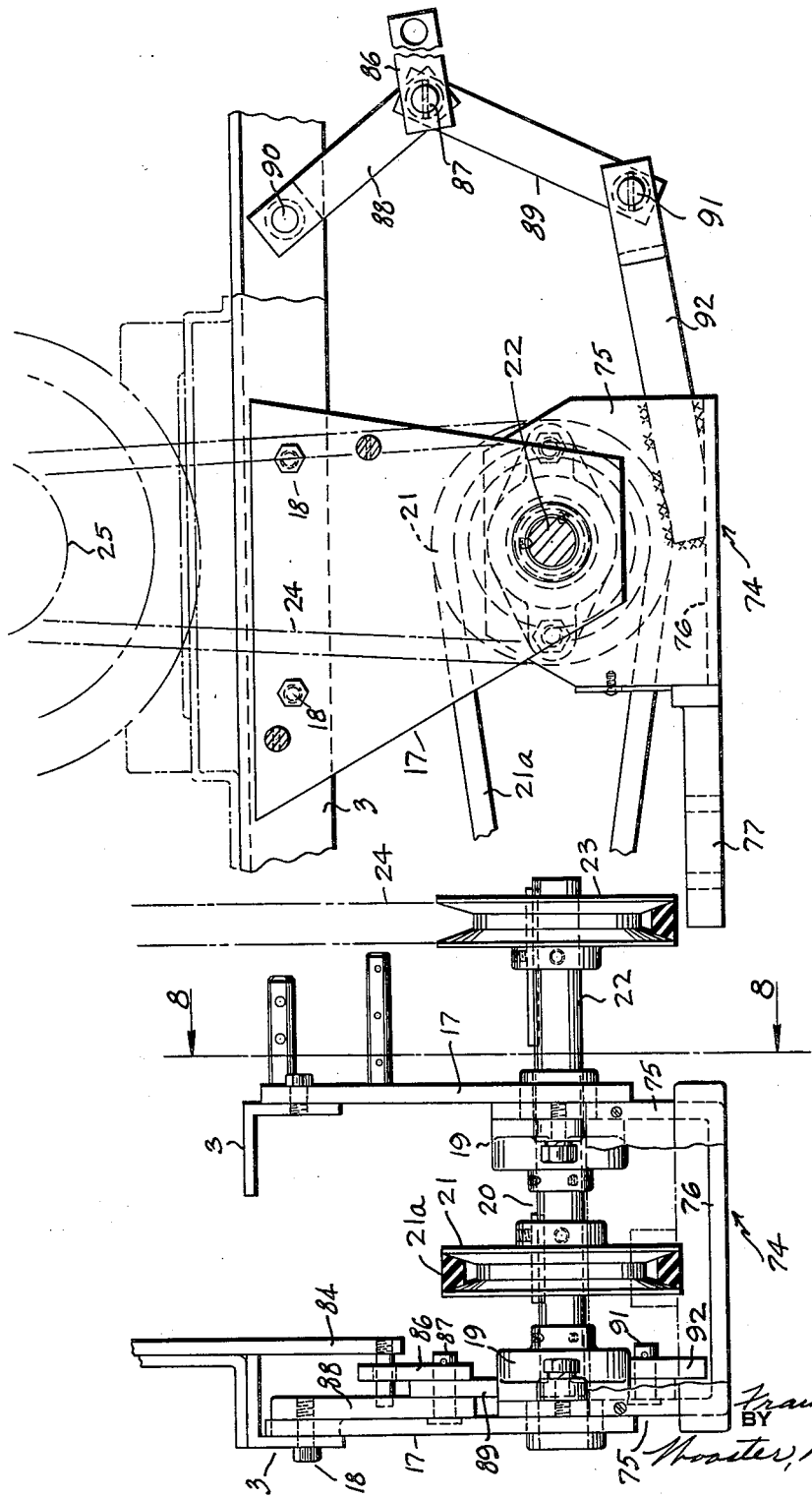

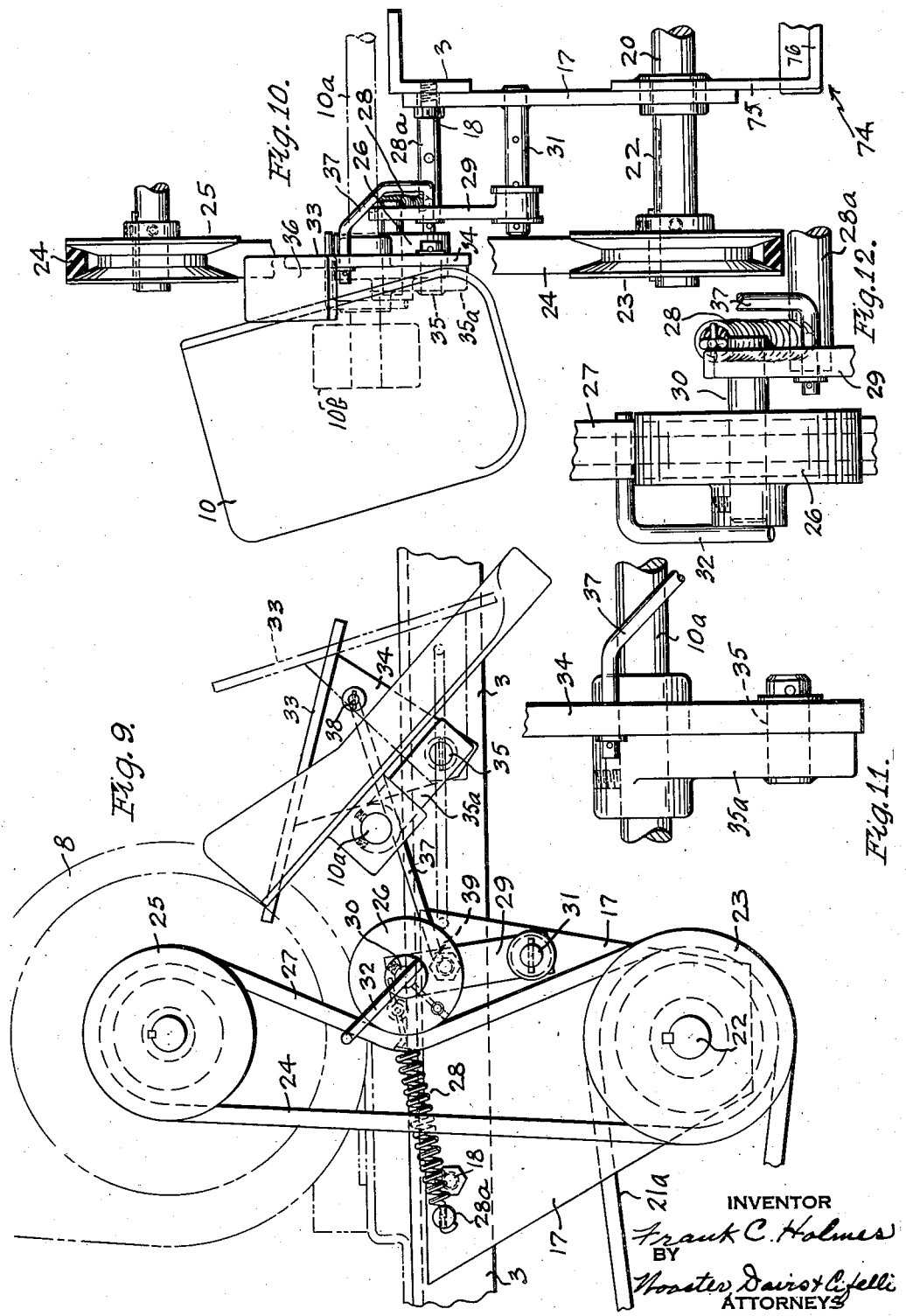

United States Patent Office 2,991,612
Patented July 11, 1961

1

2,991,612
FRONT MOUNTED MOWER FOR RIDING
TRACTOR
Frank C. Holmes, Trumbull, Conn., assignor to The Baird
Machine Company, Stratford, Conn., a corporation
of Connecticut
Filed June 1, 1959, Ser. No. 817,338
7 Claims. (Cl. 56—25.4)

This invention relates to a mower for a riding tractor, and has for an object to provide an improved construction of mower which may be readily attached to the tractor for operation at the front thereof, and as readily detached when it is desired to use the tractor for other operations.

Another object is to provide a mower attachment or unit with a full floating mounting whereby the unit can float so as to conform to and follow ground irregularities without danger of scalping the high spots, and so forth.

A further object is to provide an improved arrangement of the rotating cutter blades, and an improved and simplified driving means for these blades from the motor of the tractor, together with effective control thereof.

Still another object is to provide improved means whereby the mower may be raised and lowered by the operator while the tractor is in motion so as to clear various objects in the course of mowing operations.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

FIG. 3 is a side view of the mower unit on a larger scale and with parts broken away;

FIG. 4 is a top plan view of FIG. 3, with parts broken away and parts shown in section;

FIG. 5 is a plan view of a cutter and blades;

FIG. 6 is a partial side view and partial section thereof;

FIG. 7 is a transverse elevation on a larger scale of a portion of the cutter drive means with parts broken away and others in section;

FIG. 8 is a side view and section of the parts of FIG. 7, the view being substantially on the plane of line 8—8 of FIG. 7;

FIG. 9 is a side view on an enlarged scale of a portion of the drive from the tractor motor and the control means therefor;

FIG. 10 is an elevational view thereof looking from the right of FIG. 9 and with parts broken away;

FIG. 11 is a detail elevation of a part of the control means, and

FIG. 12 is an elevational view on an enlarged scale of another part of the control means.

Figure 1:
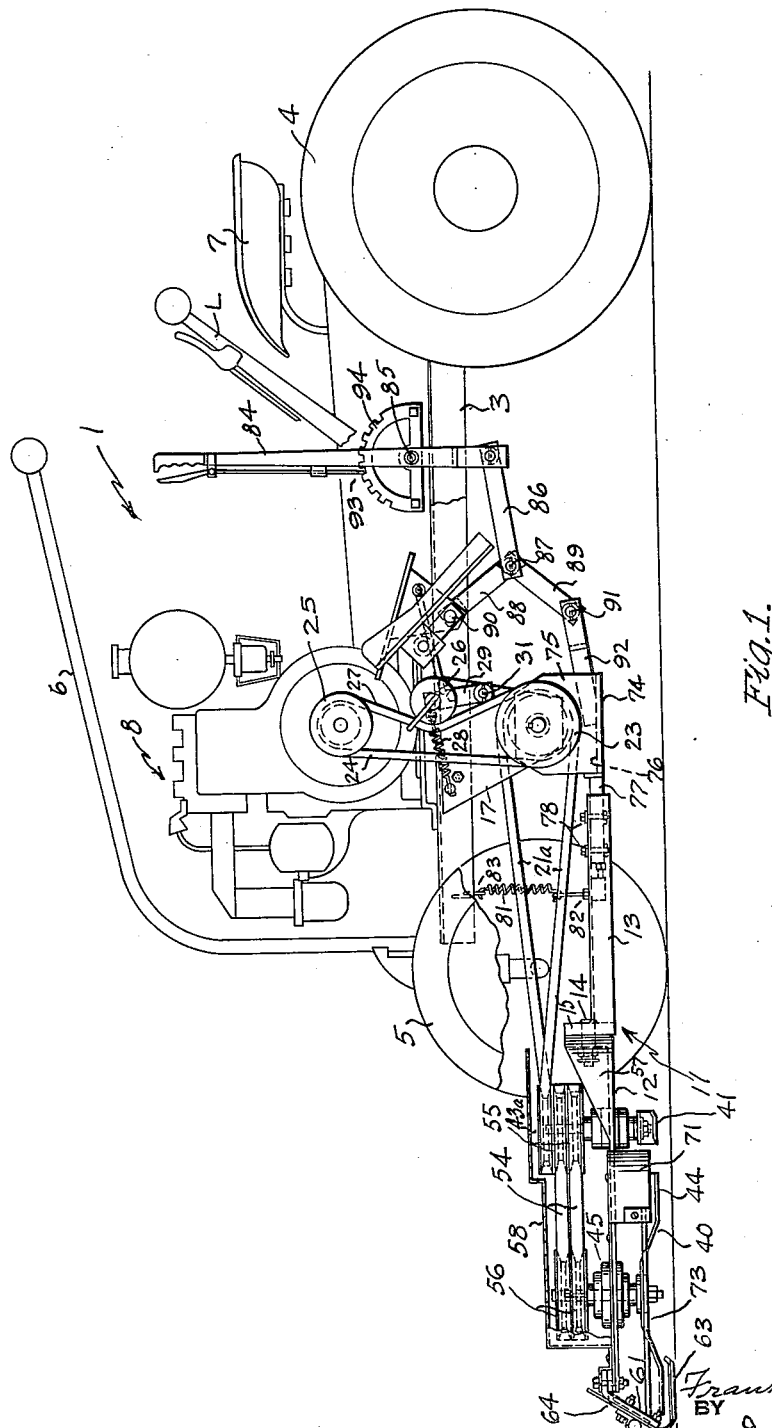
FIG. 1 is a side view showing the mower applied to a tractor, with parts broken away to more clearly show the construction.

The mower is shown as a unit attached to a riding tractor to operate at the front of the tractor. The tractor is shown somewhat diagrammatically at 1, comprising a frame 2 including a pair of longitudinally extending laterally spaced angle members 3 supported by the rear driving wheels 4, and the forward steering wheels 5 operated by the steering means 6 from a seat 7 for the driver. The tractor is driven by any suitable driving means to the rear wheels (not shown) from a suitable motor 8 mounted on the frame, and in addition to the steering means 6 the tractor is controlled by suitable control means (not shown) from a foot pedal 9, and a hand lever L. There may be a stationary foot rest 10.

The mower comprises a complete unit or attachment mountable as such on the frame of the tractor, and is readily attachable thereto in operative position, and as readily detached therefrom when it is desired to use the tractor for other operations. The mower comprises a frame 11 including two sections 12 and 13 which are pivotally connected together at 14 for relative turning or swinging movements about a horizontal axis, the rear section 13 being provided with an upright end member 15 at the forward end thereof, and the section 12 being formed in a similar upright wall 16 at the rear end thereof, the two being arranged side by side and pivotally connected by a suitable pivot 14, as indicated.

The rear section 13 is of inverted channel shape and is pivotally connected at its rear end to the frame 2 of the tractor to swing up and down or in a vertical plane about a horizontal axis, and thus the whole mower unit is adapted for up and down movement, and the forward section 12 carrying the rotary cutter blades, as will presently be described, is also adapted to swing or turn about a horizontal axis provided by the pivotal connection 14. The whole unit thus has a full floating mounting whereby it can float so as to conform to ground irregularities without danger of scalping the high spots, and may follow other irregularities in the surface of the lawn being mowed.

The means for connecting the rear end of the section 13, and therefore the rear end of the mower frame, to the tractor comprises a pair of brackets 17 in the form of plates secured to the upright flanges 3a, one to each of the side members 3 of the tractor frame, and depending therefrom, as shown in FIGS. 3 and 8, these brackets being secured to the tractor frame by any suitable means, such for example, as the bolts or rivets 18. These brackets or plates 17 are therefore arranged vertically and are laterally spaced, and mounted in these brackets by suitable bearings 19 is a transverse drive shaft 20 carrying between the brackets a grooved drive pulley 21 keyed or otherwise secured to this shaft. The shaft projects at one end 22 outwardly from one of the brackets 17, and mounted thereon and keyed to it is a grooved pulley 23 driven by a V-belt 24 from a grooved drive pulley 25 operated by the motor 8.

This drive is controlled by an idler pulley or roller 26 engaging one run of the belt 24, such, for example, as the rear run 27, as shown, and is held against the belt by a suitable spring 28 connected at one end to a supporting arm 29 for the pulley and at its other end to the stud 28a secured to the frame member 3, to insure the necessary tightness to provide the necessary friction between the belt and the pulleys 23 and 25 to insure driving of the pulley 23. The idler 26 is mounted on a lever support 29 by means of a suitable shaft 30, the support being pivoted to the adjacent bracket 17 on the stud at 31. A guide member 32 may be secured to the end of the shaft 30 and pass back of the run 27 of the belt to help maintain the proper relation between the belt and the idler. The operation of this idler is controllable by the operator by means of a foot treadle 33 including a downwardly extending supporting plate 34 pivotally connected at 35 to an arm 35a mounted on the shaft 10a to which the floor rest 10 is secured by the block 10b. The pedal 33 is provided with a top foot rest or pad 36 with a link or rod 37 connected at one end to the pedal 33 at 38 and the other end to the supporting lever 29 for the idler at 39. By means of this foot treadle the idler 26 may be shifted by the operator from the belt 27 to thus make the belt so loose as to render its driving effect on the pulley 23 ineffective, but the pulley is held against the belt for normal driving effect by the spring 28.

Figure 2:
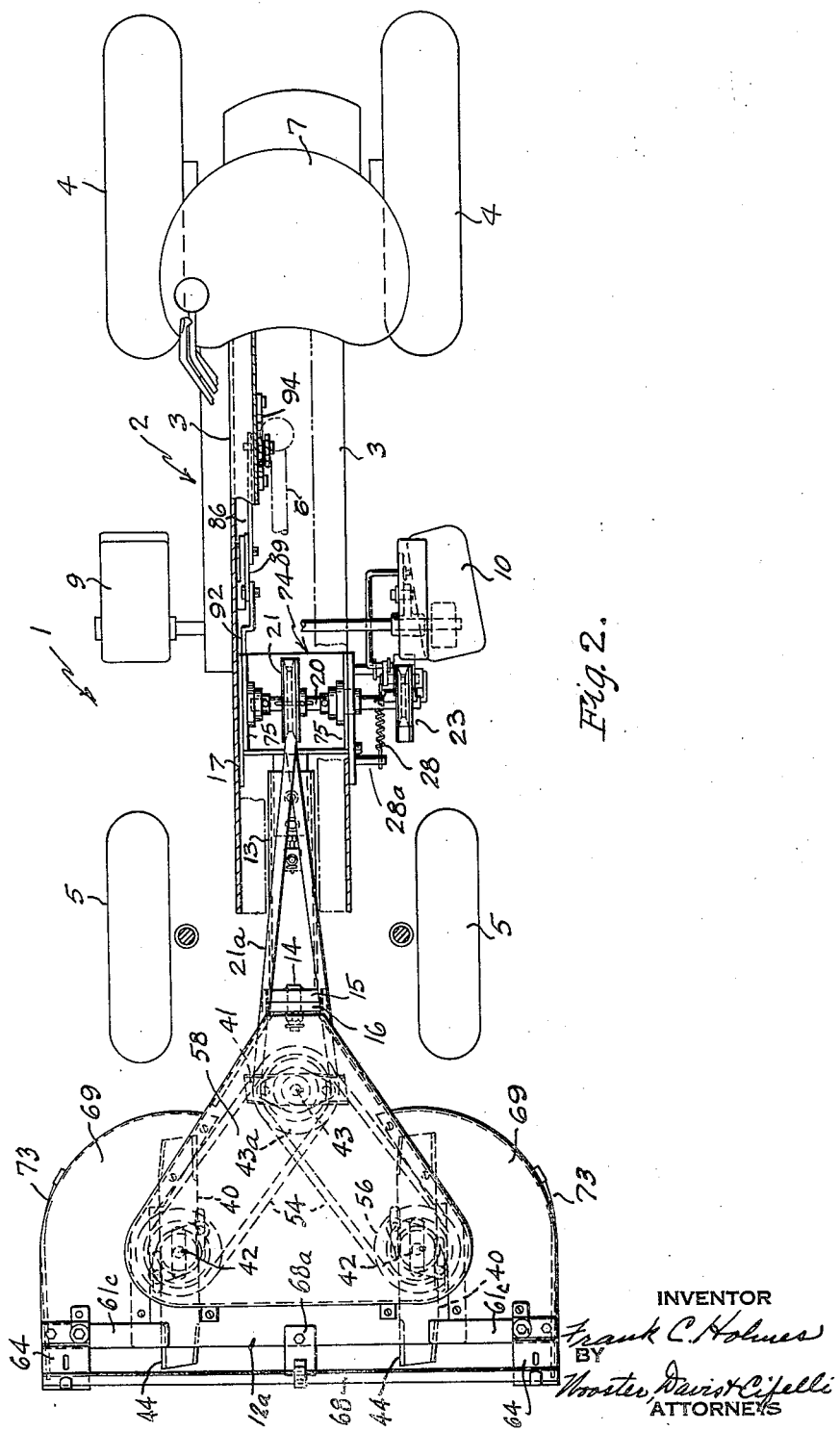
FIG. 2 is a top plan view with parts broken away and parts shown in section.

Mounted on the forward section 12 of the mower frame are the rotary cutters comprising horizontal knife blades. In the arrangement shown there are three of these cutters, two forward cutters 40 of larger diameter, and a rear cutter 41 of smaller diameter. That is, the blades of the cutters 40 are longer blades than the blades of the cutter 41, these cutters are of the form comprising two blades extending in opposite directions from their supporting and rotating shafts 42 and 43, and each provided with a forwardly facing knife or cutting edge 44 extending inwardly from its free end. The cutters are mounted on vertical shafts so as to rotate about vertical axes, the shafts 42 being mounted in suitable bearings 45 in this forward section 12 of the mower frame, and the vertical shaft 43 being mounted in suitable bearings 46 in this frame section. The shaft 43 is driven by a grooved pulley 43a from the pulley 21 by a V-belt 21a. The blades of the three cutters 40 and 41 are located in the same horizontal plane the two cutters 40 being arranged side by side but with their supporting shafts 42 spaced a sufficient distance so the free ends of the blades do not interfere, as indicated by the broken line circles 47, and as they thus leave a strip of grass between them which is not cut by these blades, this strip is cut by the cutter 41, which is located to the rear of the cutters 40 and between them, or on the horizontal center line midway between the two cutters 40, as indicated in FIGS. 2 and 4. The bearings 45 are adjustably mounted in the section 12 of the mower frame, which comprises a plate section 12a. The bearings comprise portions 48 and 49 mounted respectively on the upper and under sides of the plate 12a and include laterally extending lugs 50 on opposite sides thereof at the upper and lower sides of the plate 12a and are secured together by screws or bolts 51 passing through these lugs and elongated slots 52 in the plate. The plate is also provided with elongated slot 53 through which the shaft 42 extends. This permits adjustment of the shaft 42 and the cutters longitudinally of the frame to adjust the location of the cutters and also the tightness of the driving belts 54 running between the grooved pulleys 55, 56 keyed to the shafts 43 and 42 respectively. The bearing 46 is of similar construction, but is not adjustable in the frame. At its rearward end the frame 12 is strengthened by upwardly extending flanges 57 at the opposite side edges thereof and of which the end wall 16 is also a part so that this wall is strengthened by these flanges. A suitable covering 58 with downwardly extending side walls 59 may be mounted on the top of the section 12 to enclose and form a guard over the pulleys and the driving belts and may be secured to the plate 12a by any suitable means, such, for example, as the screws 60.

Mounted on the plate 12a at the forward edge thereof and at its opposite side ends are brackets 61 which are inclined downwardly, and mounted for vertical adjustment on the forward sides thereof are supporting shoes 62, including ground engaging portions 63 extending under the plate and upwardly extending portions 64 adjustably secured on the brackets 61 by suitable bolts 65 passing through elongated slots 66 in these members to permit vertical adjustment of the shoes. These shoes thus rest on the surface of the ground or lawn during the mowing operation and support the cutters at the proper distance above the surface to control the height at which the grass is cut. The brackets 61 may be secured by bolts 61a to straps 61b and bars 61c to plate 12a and guard 69. There is also mounted on these brackets by means of the bolts 65 clamps 67, a guard rod 68 which may be either a solid rod or a pipe extending across the front of the mower to protect the blades and also provide a guard means to prevent persons getting injured by the cutters. This rod also proves to quite definite advantage when working in rough areas where brush and high grass is encountered, in its ability to knock down the grass and brush previous to this material being cut by the cutters. The rod 68 may be supported at its center by an additional bracket 68a. There may also be suitable guards 69 over the blades as they project beyond the plate 12a at the sides, these including top portions resting on the top of the plate 12a and secured thereto by suitable screws 70, and at their outer edges provided with downwardly extending side walls 71 at the rear of the larger cutters 40. The forward edge 72 of these side walls is spaced from the front of the plate 12a providing lateral discharge openings for the cuttings cut from the lawn by the blades of the cutters 40. To help hold the guards 69 in place and also provide a protective guard across these blades there is a rod 73 secured to the guard 71 at 74.

As previously indicated, the rearward end of section 13 of the mower frame is pivotally connected to the tractor frame by shaft 22, to permit up and down movement of the mower frame and the rotary cutters carried by this frame. This connecting means comprises a U-shaped member 74 including upright laterally spaced side members 75 at the inner sides of brackets 17 and pivotally supported on shaft 22, and a transverse connecting portion 76 extending between the side legs or portions 75. This member 74 is connected to section 13 by a forwardly extending bar 77 secured to the top wall of section 13 by bolts 78 passing through an elongated slot 79 in section 13 permitting longitudinal adjustment between section 13 and member 74 which may be controlled by adjusting screw 80. To assist in counterbalancing the weight of the mower frame and parts carried thereby is a spring 81 connected at its lower end to section 13 at 82 and at its upper end to the tractor frame at 83.

For lifting the mower unit to an inoperative position when not in use there is a hand lever 84 pivoted to the tractor frame at 85 and connected at its lower end by a link 86 at 87 to a toggle comprising the pivotally connected members 88 and 89 one of which 88 is pivotally connected to the tractor frame at 90 and the other connected at 91 to a bar 92 welded to one of the side members 75 of the member 74. The lever 84 may be held in different positions and the mower unit at different elevations by ratchet 93 cooperating with toothed segment 94.

Thus this improved mower may be readily attached to and detached from the tractor as a unit; it has an improved arrangement of rotary cutters whereby no surface of the lawn is skipped in the mowing operation; the mower has a full floating construction whereby it may conform to all the irregularities of the lawn surface for uniform mowing of the lawn, its operation may be readily controlled by the operator, and the mower may be readily lifted to inoperative position by the operator of the tractor to avoid an obstruction or for transportation from one location to another.

With this unit employing the three cutters arranged as described, the two forward and larger cutters are on a line with each other which allows the unit to be used to advantage in cases where trimming is required, whereas units where only two cutters are utilized, one being staggered somewhat out of line with the other, presents certain limitations when close trimming is required. The unit can mow while being operated either in the forward or reverse direction, and it can also be used for leaf mulching. Another important advantage is that in using this mower in combination with the tractor as shown, a much heavier job of mowing can be done than with many units on the market, in that this type of tractor has a low gear which can be used when mowing in heavy or brushy areas for giving a slow forward travel, and the heavy duty motor provides plenty of power for driving the blades at the required speed to do the heavy cutting work required.

Having thus set forth the nature of my invention, I claim:

1. In combination a tractor including a frame and a motor mounted on the frame, a mower attachment including a frame comprising forward and rear sections, a horizontal shaft mounted in and extending transversely of the tractor frame, a pulley on said shaft, a belt drive from the motor to said pulley, said shaft providing a pivotal connection for the mower frame to the tractor frame permitting up and down movement of the mower frame as a unit, rotary cutters mounted on vertical shafts in the forward section of the mower frame, pulleys on the cutter shafts, belt drives from the horizontal shaft pulley to the cutter pulleys, and a pivotal connection between the sections of the mower frame located between the cutters and the horizontal shaft arranged to permit the forward section carrying the cutters of swing laterally about a horizontal axis.

2. The combination of claim 1 in which there is an idler pulley engaging one run of the belt drive from the motor to the pulley on the horizontal shaft, a pivotal support for the idler pulley on the tractor frame, a spring connected to said pivotal support and biased to press the idler pulley against the belt, a foot pedal pivoted on the tractor frame, and an operative connection from the pedal to the idler pulley support whereby pressure of the pulley on the belt may be controlled.

3. The combination according to claim 1 in which there is a toggle connection between the tractor frame and the mower frame capable of shifting the mower frame upwardly about the horizontal shaft, a hand lever pivotally mounted on the tractor frame, an operative connection from the hand lever to the toggle, and a releasable catch for retaining the hand lever in different positions.

4. A mower attachment for a tractor having a driving motor, said attachment comprising a frame including a forward section and a rear section, pivotal means connecting the sections arranged to permit lateral movements of the forward section about a horizontal axis, pivotal means for connecting the rear section to a tractor frame to permit up and down movements of the mower frame, a pair of blade cutters of relatively large diameters arranged side by side in the same plane to rotate about vertical axes in the forward section, a third blade cutter mounted to rotate in the same plane between and to the rear of the first cutters and about a vertical axis, driving pulley and belt connections between the cutters, and means for connecting said driving means to the motor driving means.

5. A mower attachment according to claim 4 in which there are a pair of supporting shoes mounted at the front edge of the forward section of the frame at the opposite ends thereof and extending downwardly under the frame providing ground supports for the frame, and a guard rod mounted on the shoe supports and extending transversely at the forward edge of the forward section.

6. The combination according to claim 1 in which there is a pair of shoes mounted at the forward side of said forward section at opposite transverse ends thereof and extending downwardly and under the forward section providing a ground support therefor.

7. The combination according to claim 6 in which there are supports for said shoes and a guard bar extending transversely between and connecting said supports at the forward side of said forward section.

References Cited in the file of this patent

UNITED STATES PATENTS

| | | |
|---|---|---|
| 2,465,405 | Strawn | Mar. 29, 1949 |
| 2,801,510 | Colburn | Aug. 6, 1957 |
| 2,828,599 | Haynes | Apr. 1, 1958 |